US009856631B2

(12) United States Patent
Stanley

(10) Patent No.: US 9,856,631 B2
(45) Date of Patent: Jan. 2, 2018

(54) RAIN CATCHER WITH RELEASE COUPLING

(71) Applicant: Tim K. Stanley, St. Petersburg, FL (US)

(72) Inventor: Tim K. Stanley, St. Petersburg, FL (US)

(*) Notice: Subject to any disclaimer, the term of this patent is extended or adjusted under 35 U.S.C. 154(b) by 52 days.

(21) Appl. No.: 14/868,729

(22) Filed: Sep. 29, 2015

(65) Prior Publication Data
US 2017/0089046 A1 Mar. 30, 2017

(51) Int. Cl.
E03B 3/02 (2006.01)
F16L 15/08 (2006.01)
F16L 33/22 (2006.01)
B67D 3/00 (2006.01)
B63B 17/00 (2006.01)

(52) U.S. Cl.
CPC .............. E03B 3/02 (2013.01); B63B 17/00 (2013.01); B67D 3/0061 (2013.01); F16L 15/08 (2013.01); F16L 33/22 (2013.01)

(58) Field of Classification Search
CPC .......... B67D 3/0061; E03B 3/02; B63B 17/00
See application file for complete search history.

(56) References Cited

U.S. PATENT DOCUMENTS

| 770,539 | A | | 9/1904 | Ryan | |
|---|---|---|---|---|---|
| 1,977,592 | A | | 10/1934 | Reure et al. | |
| 2,977,969 | A | | 4/1961 | Weikly | |
| 3,205,923 | A | * | 9/1965 | Wilson | F16K 24/04 137/588 |
| 3,674,061 | A | | 7/1972 | Calisher et al. | |
| 3,765,168 | A | | 10/1973 | Wagle | |
| 4,136,605 | A | | 1/1979 | Johnson | |
| 4,142,647 | A | | 3/1979 | Walters | |
| 4,245,666 | A | * | 1/1981 | Norris | E04D 13/00 137/357 |
| 4,633,899 | A | * | 1/1987 | Lord | E04B 1/70 137/312 |
| 4,673,010 | A | * | 6/1987 | Prufer | A47C 27/085 141/1 |

(Continued)

OTHER PUBLICATIONS http://www.archermarine.ca/p/16-zodiac-futura-III_19.html?m=0.

(Continued)

Primary Examiner — Timothy L Maust
(74) Attorney, Agent, or Firm — Ryan T. Grace; Advent, LLP

(57) ABSTRACT

Aspects of the disclosure relate to systems and fittings for a rain catcher for a marine vessel. A fitting can include a connector body having a first connector end and a second connector end, where the first connector end is configured to connect to a rain catcher of the gravity-fed fluid and the second connector end is configured to connect to a fluid storage tank so that the first connector end is above the second connector end. The connector body defines an interior and an exterior, where the interior is in fluid communication between the first connector end and the second connector end. The fitting can also include one or more ports (e.g., nozzles) laterally defined through the exterior of the connector body and disposed vertically between the first connector end and the second connector end, where the ports are in fluid communication with the interior of the connector body.

6 Claims, 4 Drawing Sheets

(56) References Cited

U.S. PATENT DOCUMENTS

| | | | | |
|---|---|---|---|---|
| 4,756,349 | A * | 7/1988 | Atkins | B67D 7/0294 141/114 |
| 5,044,397 | A | 9/1991 | Szlaga et al. | |
| 5,127,118 | A * | 7/1992 | Johenning | A47C 27/085 141/285 |
| 5,172,718 | A * | 12/1992 | Thornburgh | B67C 11/04 137/312 |
| 5,225,158 | A | 7/1993 | Tayebi et al. | |
| 5,299,591 | A * | 4/1994 | Duncan | E04B 9/02 137/15.11 |
| 5,706,857 | A | 1/1998 | Dowling, Jr. et al. | |
| 5,762,114 | A | 6/1998 | Petersen | |
| 5,934,993 | A | 8/1999 | Maruyama | |
| 6,036,751 | A | 3/2000 | Ribardi et al. | |
| 6,167,911 | B1 | 1/2001 | Diamond | |
| 6,283,144 | B1 * | 9/2001 | Kahn | E04D 13/00 137/15.11 |
| 6,497,260 | B2 * | 12/2002 | Hennan | B67D 7/0238 141/384 |
| 6,502,632 | B1 | 1/2003 | Pittman | |
| 6,622,750 | B1 * | 9/2003 | Bergeron | E04B 9/00 137/15.11 |
| 6,702,337 | B2 * | 3/2004 | Rutter | F16L 41/02 285/362 |
| 6,981,534 | B2 * | 1/2006 | Williams | B65B 3/045 141/346 |
| 7,290,557 | B1 | 11/2007 | Bowman | |
| 7,331,357 | B2 * | 2/2008 | Huff | E04B 9/00 137/312 |
| 7,416,087 | B2 | 8/2008 | Press | |
| 7,591,289 | B1 | 9/2009 | Hamada | |
| 8,132,374 | B2 | 3/2012 | Lee et al. | |
| 8,602,460 | B2 * | 12/2013 | Heuwinkel | A47C 27/085 285/181 |
| 9,204,780 | B2 | 12/2015 | Francisco et al. | |
| 2002/0092760 | A1 | 7/2002 | Johnson | |
| 2002/0129547 | A1 | 9/2002 | Chiu | |
| 2006/0048816 | A1 | 3/2006 | Brock et al. | |
| 2007/0107779 | A1 | 5/2007 | Brook et al. | |
| 2008/0006635 | A1 | 1/2008 | Bader et al. | |
| 2008/0083457 | A1 | 4/2008 | Konshak | |
| 2010/0196873 | A1 | 8/2010 | Woods | |
| 2011/0203196 | A1 | 8/2011 | Lee et al. | |
| 2012/0192904 | A1 | 8/2012 | Francisco et al. | |
| 2014/0283312 | A1 | 9/2014 | Bocchino et al. | |

OTHER PUBLICATIONS http://www.plastomatic.com/arv.html.
http://nypassivehouse.org/aays-air-admittance-valves/.
http://www.spxflow.com/en/waukesha-cherry-burrell/pd-wcb-relief-valves-air-vent-40cfar/.
http://www.haywardflowcontrol.com/shop/en/flow-control/ar-series-air-release-valves.
https://www.toro.com/en/agriculture/irrigation-valves/air-release-valves.
http://www.generant.com/vrv.shtml.
http://www.supplyhouse.com/Air-Eliminators-310000.
http://www.aliexpress.com/item/G1-2-radiator-auto-air-vent-valve-CE-3pcs-lot-retail-wholesale-available/540121807.html?spm=2114.40010508.4.30.PyEHPr.
http://inspectapedia.com/heat/Air_Bleeder_Valves.php.
http://lenzinc.com/products/hydraulic-adapters/hydraulic-air-bleed-valves.
http://web.archive.org/web/20150502122429/http://www.archermarine.ca/p/16zodiacfuturalll_19.html.
http://www.alibaba.com/product-detail/Air-release-valve_953520606.html.
http://www.alibaba.com/product-detail/EV0510-Dual-Acting-Countinuous-2-Air_60091602023.html.

* cited by examiner

US 9,856,631 B2

RAIN CATCHER WITH RELEASE COUPLING

BACKGROUND

Rainwater can be caught and stored on boats and other marine vessels. For example, rain catchers, sun covers, awnings, and so on can be used with gutters and hose pipes to catch water and channel it into tanks, jugs, and so forth.

SUMMARY

This Summary is provided to introduce a selection of concepts in a simplified form that are further described below in the Detailed Description. This Summary is not intended to identify key and/or essential features of the claimed subject matter. Also, this Summary is not intended to limit the scope of the claimed subject matter in any manner.

Aspects of the disclosure can relate to a rain catcher system for a marine vessel. The system can include a catcher for receiving a gravity-fed fluid, a fluid storage tank of the marine vessel for storing the gravity-fed fluid, and a fitting. The fitting can include a connector body having a first connector end and a second connector end, where the first connector end is configured to connect to the catcher and the second connector end is configured to connect to the fluid storage tank so that the first connector end is above the second connector end. The connector body defines an interior and an exterior, where the interior is in fluid communication between the first connector end and the second connector end. The fitting can also include one or more ports laterally defined through the exterior of the connector body and disposed vertically between the first connector end and the second connector end, where the ports are in fluid communication with the interior of the connector body. In some embodiments, a passage can be defined from the first connector end into the interior of the connector body (e.g., where the passage has a lower end that extends below the ports). In some embodiments, a stop can be disposed proximate to the second connector end for preventing a connection to the fitting from obscuring the ports.

Aspects of the disclosure can also relate to a fitting for a rain catcher for a marine vessel. The fitting can include a connector body having a first connector end and a second connector end, where the first connector end is configured to connect to a rain catcher of the gravity-fed fluid and the second connector end is configured to connect to a fluid storage tank so that the first connector end is above the second connector end. The connector body defines an interior and an exterior, where the interior is in fluid communication between the first connector end and the second connector end. The fitting can also include one or more ports (e.g., nozzles) laterally defined through the exterior of the connector body and disposed vertically between the first connector end and the second connector end, where the ports are in fluid communication with the interior of the connector body. In some embodiments, a passage can be defined from the first connector end into the interior of the connector body (e.g., where the passage has a lower end that extends below the ports). In some embodiments, a stop can be disposed proximate to the second connector end for preventing a connection to the fitting from obscuring the ports.

DRAWINGS

The Detailed Description is described with reference to the accompanying figures.

DETAILED DESCRIPTION

Aspects of the disclosure are described more fully hereinafter with reference to the accompanying drawings, which form a part hereof, and which show, by way of illustration, example features. The features can, however, be embodied in many different forms and should not be construed as limited to the combinations set forth herein; rather, these combinations are provided so that this disclosure will be thorough and complete, and will fully convey the scope. The following detailed description is, therefore, not to be taken in a limiting sense.

Figure 1:
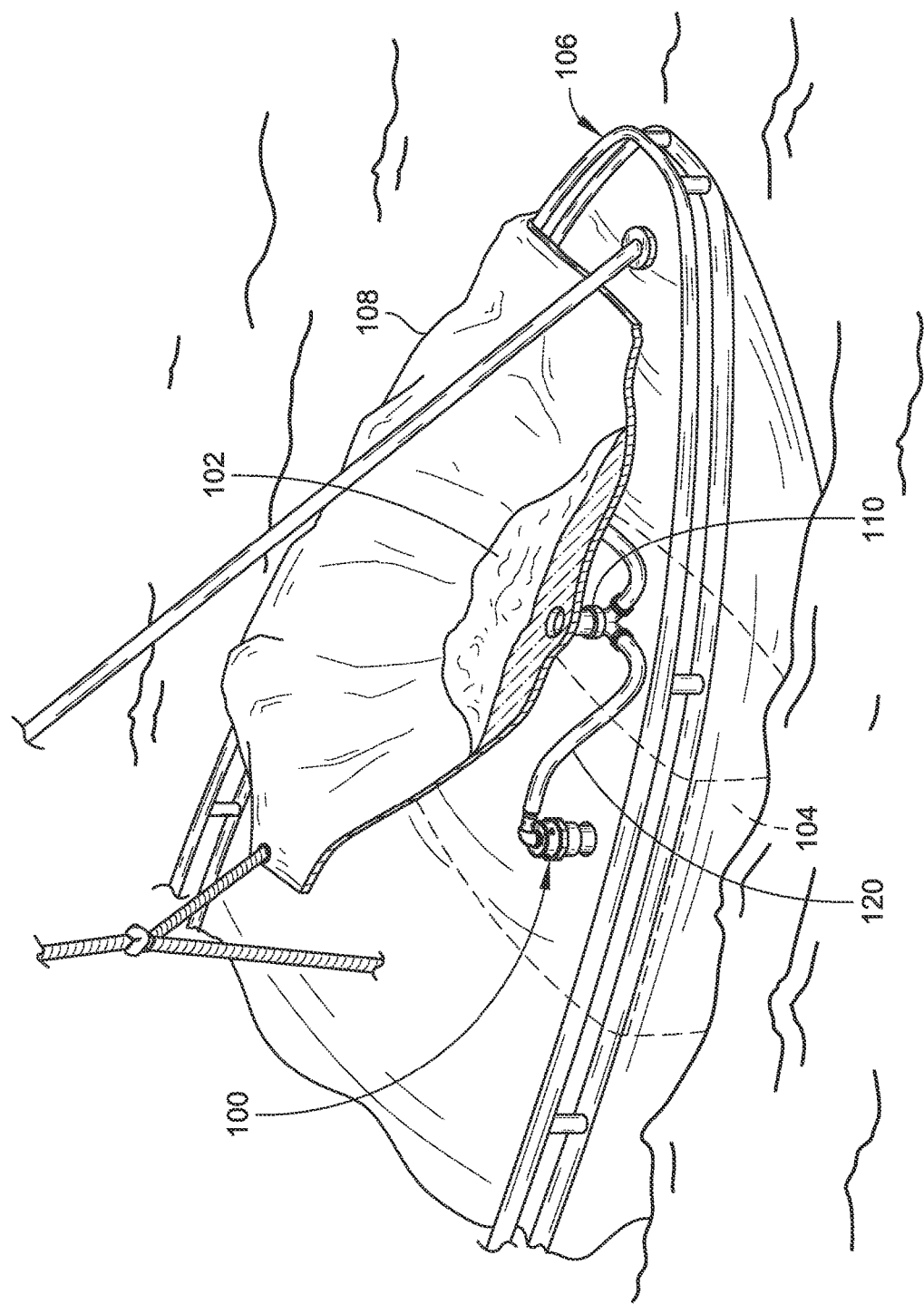
FIG. 1 is a partial perspective view of a marine vessel having a rainwater storage tank, where a tarp is used to capture rainwater and a fluid connection is used to direct the rainwater from the tarp to the storage tank, and where a fitting is used to couple the fluid connection to the storage tank in accordance with an example embodiment of the present disclosure.

Referring generally to FIGS. 1 through 4, a fitting 100 for connecting a gravity-fed fluid (e.g., rainwater 102) to a fluid storage tank (e.g., a rainwater storage tank 104) is described. With reference to FIG. 1, one or more fittings 100 can be used with, for example, a marine vessel 106 having a rainwater storage tank 104, where a catcher (e.g., a tarp 108) is used to capture rainwater 102, and a fluid connection 110 is used to direct the rainwater 102 from the tarp 108 to the rainwater storage tank 104 (e.g., below the fluid connection 110). In this example, a fitting 100 is used to couple the fluid connection 110 to the rainwater storage tank 104. In embodiments of the disclosure, the fitting 100 directs the rainwater 102 into the rainwater storage tank 104 (e.g., until the tank reaches its capacity). Air in the rainwater storage tank 104, which is lighter than the rainwater 102, can be expelled through ports 130, reducing or eliminating pressure that may otherwise build up in the tank and hinder storage of the rainwater 102. Further, excess rainwater 102 can be directed out of the fitting 100 (e.g., rather than back through an upper connector end of the fitting 100) and onto the deck of the marine vessel 106 if the rainwater storage tank 104 reaches its capacity. As such, the rainwater storage tank 104 may not require monitoring to determine when it has reached its capacity. In addition the ports 130 can be positioned "above deck," so that other less clean rainwater and/or debris from the deck of the marine vessel 106 does not enter the rainwater storage tank 104.

Figure 2:
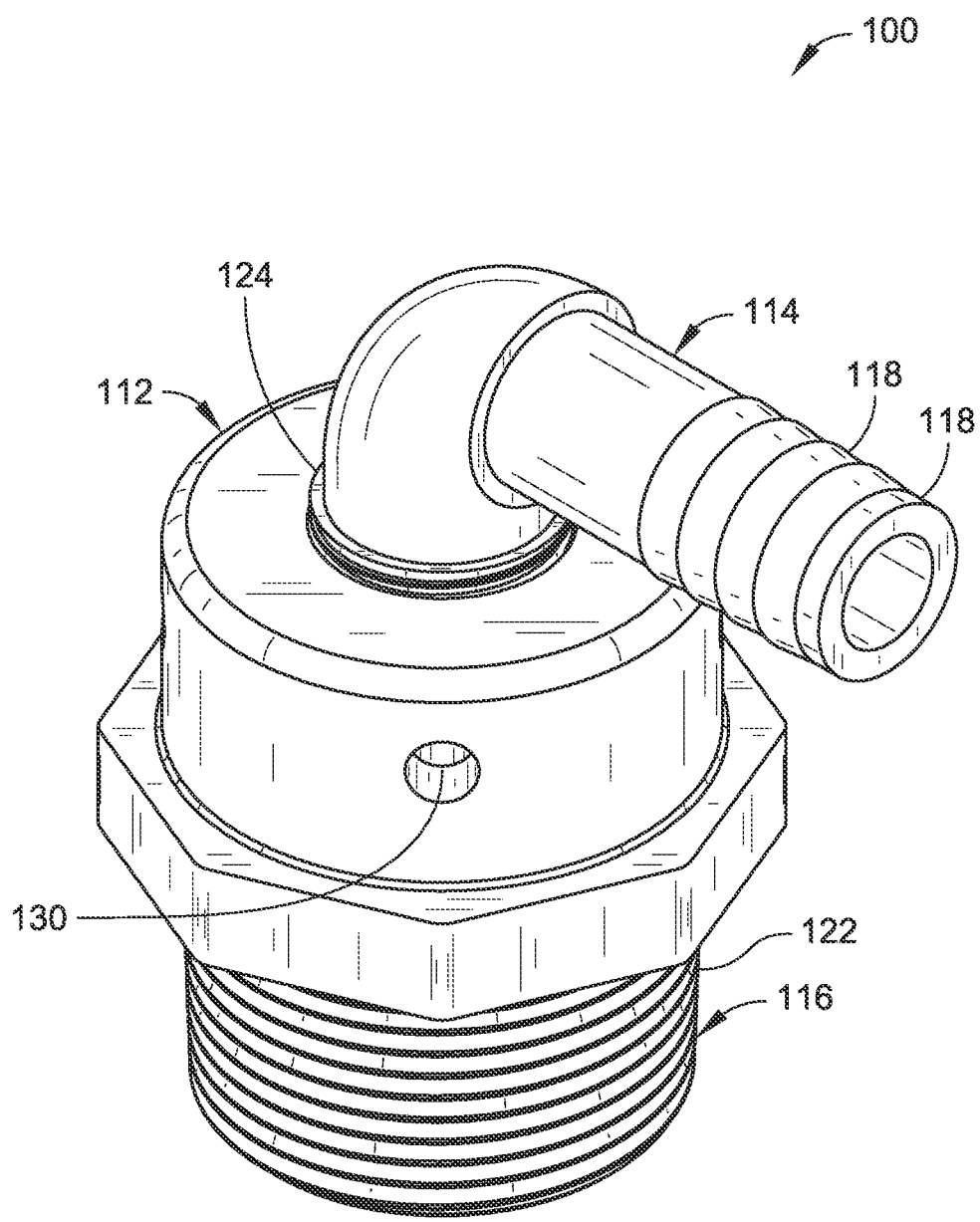
FIG. 2 is an isometric view of a fitting for connecting a gravity-fed fluid, such as the rainwater illustrated in FIG. 1, to a fluid storage tank, such as the rainwater storage tank illustrated in FIG. 1, in accordance with an example embodiment of the present disclosure.
Figure 3:
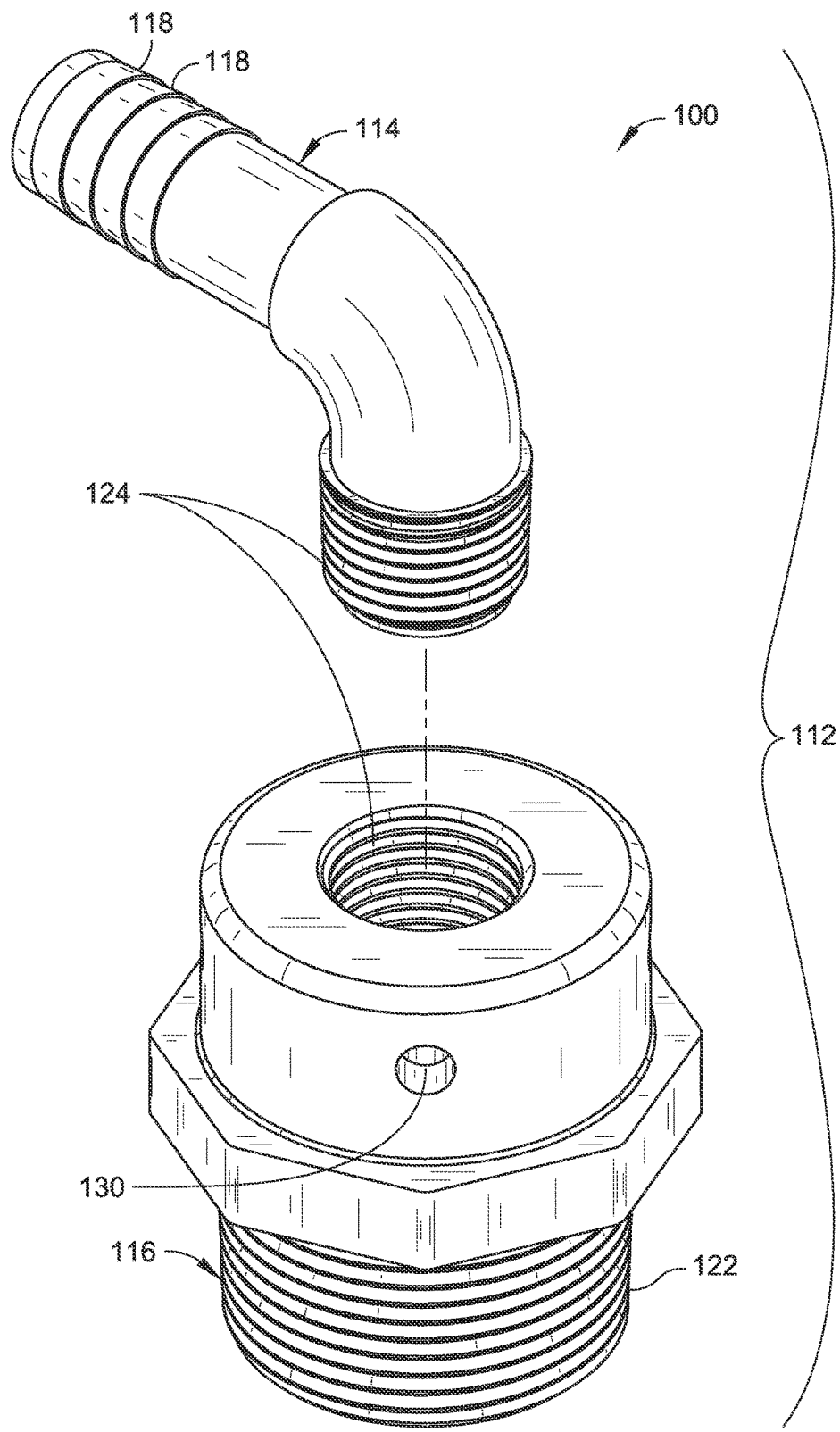
FIG. 3 is an exploded isometric view of the fitting illustrated in FIG. 2.
Figure 4:
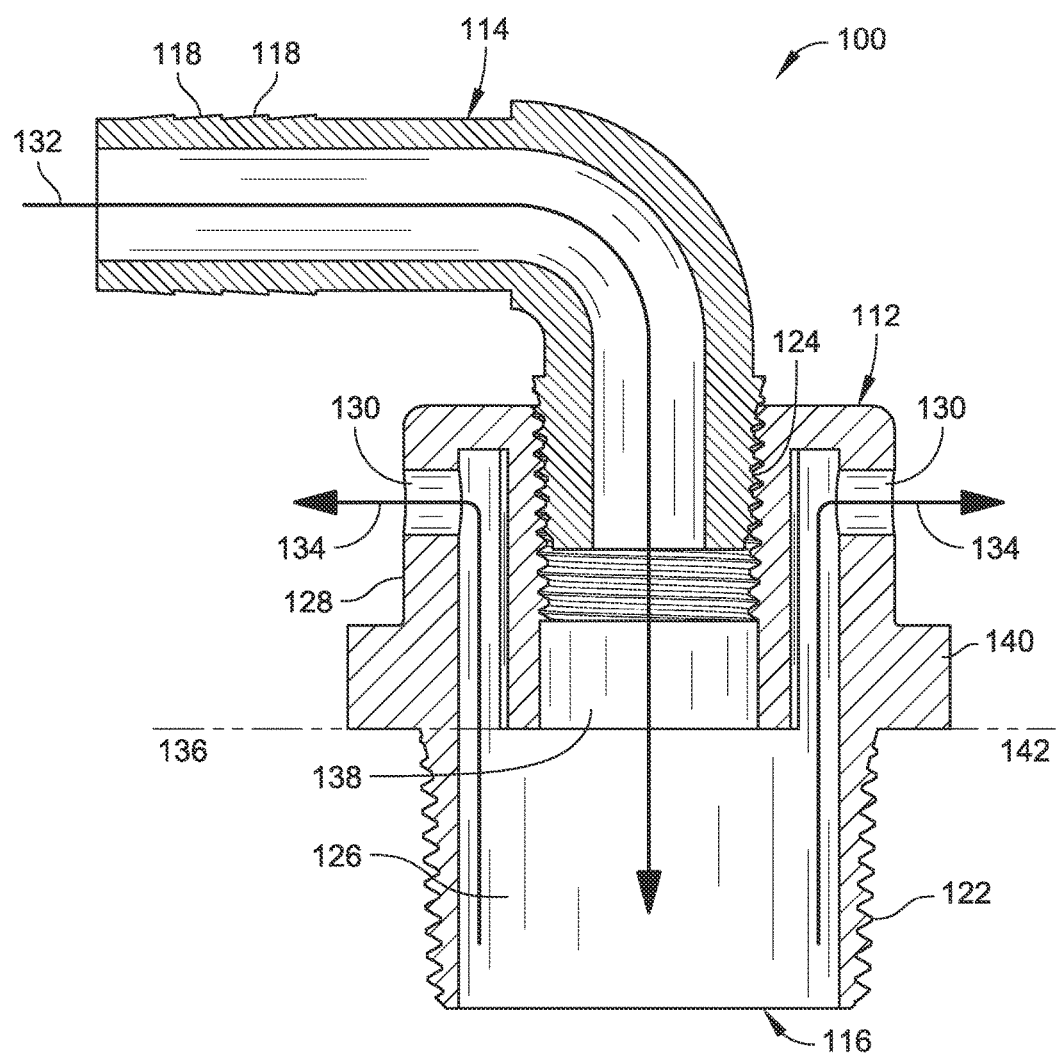
FIG. 4 is a cross-sectional side elevation view of the fitting illustrated in FIG. 2.

In embodiments of the disclosure, the fitting 100 includes a connector body 112 having a connector end 114 and a connector end 116. The connector end 114 can be configured to connect to a source of a gravity-fed fluid. For example, the connector end 114 can include one or more retention features 118 for connecting to and retaining a tube or hose 120 extending from the fluid connection 110 at the tarp 108. For instance, as shown in FIGS. 2 through 4, a retention feature 118 can be implemented as a hose barb coupler. However, this configuration is provided by way of example and is not meant to limit the present disclosure. In other embodiments, the connector end 114 can include one or more additional and/or different retention features 118 for connecting to and retaining one or more connections, including, but not necessarily limited to: a quick-connect coupler, a threaded coupler, and so forth. Further, it should be noted that a retention feature 118 may also comprise an exterior surface of the connector end 114, such as for press fitting a tube, a hose, and/or another connectable member to an end of the fitting 100.

In embodiments of the disclosure, the connector end 116 can be configured to connect to a fluid storage tank. For example, the connector end 116 can include one or more retention features 122 for connecting to an inlet of the rainwater storage tank 104. For instance, a retention feature 122 can be implemented as a threaded coupler. However, this configuration is provided by way of example and is not meant to limit the present disclosure. In other embodiments, the connector end 116 can include one or more additional and/or different retention features 122 for connecting to and retaining one or more connections, including, but not necessarily limited to: a hose barb coupler, a quick-connect coupler, and so forth. Further, it should be noted that a retention feature 122 may also comprise an exterior surface of the connector end 116, such as for press fitting a tube, a hose, and/or another connectable member to an end of the fitting 100.

In some embodiments, a fitting 100 may be formed (e.g., assembled) using multiple parts and/or pieces. For instance, as described with reference to FIGS. 2 through 4, a first part of the connector body 112 may include connector end 114, which can be connected to a second part of the connector body 112 that includes connector end 116. The parts can be connected together using, for example, a threaded connection 124 between the parts. In some embodiments, multiple parts can be fixedly (e.g., rigidly, permanently, etc.) connected together. For example, a thread-locking fluid, an adhesive, and/or another fastening material and/or technique can be used to rigidly and/or permanently connect components including connector ends 114 and 116 at the threaded connection 124 (and possibly form a watertight seal between the parts). However, this configuration is provided by way of example and is not meant to limit the present disclosure. Thus, in other embodiments, multiple parts forming a connector body 112 can be assembled to be easily separated (e.g., unthreaded for changing a connector end coupler type, etc.). Further, in some embodiments, the connector body 112 may be formed as a unitary (e.g., one-piece) part.

Referring now to FIG. 4, when the fitting 100 is used to connect the source of the gravity-fed fluid to the fluid storage tank, the connector end 114 is above the connector end 116. The connector body 112 defines an interior 126 and an exterior 128, where the interior 126 is in fluid communication between the connector end 114 and the connector end 116. In embodiments of the disclosure, one or more ports 130 (e.g., two (2) ports, three (3) ports, four (4) ports, five (5) ports, six (6) ports, etc.) are laterally (e.g., horizontally) defined through the exterior of the connector body 112 and disposed vertically between the connector end 114 and the connector end 116 when the fitting 100 is used to connect the source of the gravity-fed fluid to the fluid storage tank. The ports 130 are in fluid communication with the interior 126 of the connector body 112.

In embodiments of the disclosure, gravity-fed fluid flow 132 into the fitting 100 may bypass the ports 130 and be directed into the fluid storage tank. Fluid flow 134 (e.g., air in the tank and/or fluid directed to the tank when the capacity of the tank is met) can be directed out of the fitting 100 (e.g., rather than back through connector end 116). In this manner, air and/or other fluids lighter than the fluid directed into the tank can be expelled through the ports 130, which can reduce or eliminate hindrances to the fluid entering the tank (e.g., via pressure built up in the tank). In the example described with reference to FIG. 1, air can be expelled from the ports of the fitting 100 while the rainwater storage tank 104 is being filled, and then any excess rainwater 102 can be directed out of the fitting 100 and onto the deck of the marine vessel 106. Further, ports 130 configured as nozzles can be used to orient fluid streams of the rainwater 102 in specific directions (e.g., radially outward) with respect to the fitting 100.

In some embodiments, the connector body 112 can define a passage into the interior 126 of the connector body 112 that extends vertically to a lower end 136 oriented below the one or more ports 130 laterally defined in the exterior 128 of the connector body 112. For example, a tubular passage 138 can extend from connector end 114 into the interior 126 of the connector body 112 past the ports 130. In this manner, the fluid flow 132 into the fitting 100 can be directed past the ports 130 and into, for example, the fluid storage tank. Further, in some embodiments, the fitting 100 can include one or more stops 140, which can prevent the fitting 100 from being coupled to a storage tank in such a manner as to obscure the ports 130. Further, a stop 140 can provide a visual, external indication of the depth to which the tubular passage 138 extends into the interior 126 of the connector body 112. For example, a lower end 142 of the stop 140 may be oriented at the same (or at least substantially the same) vertical orientation as the lower end 136 of the tubular passage 138.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A rain catcher system for a marine vessel, the system comprising:
   a catcher for receiving a gravity-fed fluid;
   a fluid storage tank of the marine vessel for storing the gravity-fed fluid; and
   a fitting comprising a connector body having a first connector end and a second connector end, the first connector end to connect to the catcher, the second connector end to connect to the fluid storage tank, the first connector end to be above the second connector end when the fitting is used to connect the gravity-fed fluid to the fluid storage tank of the marine vessel, the connector body defining an interior and an exterior, the interior in fluid communication between the first connector end and the second connector end; at least one port laterally defined through the exterior of the connector body and disposed vertically between the first connector end and the second connector end when the fitting is used to connect the source of the gravity-fed fluid to the fluid storage tank of the marine vessel, the at least one port in fluid communication with the interior of the connector body; a passage defined from the first connector end into the interior of the connector body; and a stop disposed proximate to the second connector end for preventing a connection to the fitting from obscuring the at least one port.

2. The system as recited in claim 1, wherein the passage defines a lower end that extends below the at least one port, the second connector end defining a tubular passage extending from the first connector end toward the lower end of the passage, the tubular passage defining a portion of a gravity-fed fluid flow path, the at least one port defining a portion of an outbound fluid flow path, the tubular passage being distinct from the at least one port.

3. The system as recited in claim 1, wherein the stop is disposed on the exterior of the connector body and provides a visual indication of a depth to which the tubular passage extends into the interior of the connector body.

4. The system as recited in claim 1, wherein at least one of the first connector end or the second connector end comprises a retention feature.

5. The system as recited in claim 1, wherein the first connector end and the second connector end are connected together using a threaded connection.

6. The system as recited in claim 1, wherein the fluid storage tank of the marine vessel is configured to be mounted below a deck of the marine vessel, the at least one port being configured to be positioned above the deck.

* * * * *